(12) United States Patent
Kawaguchi

(10) Patent No.: US 8,447,943 B2
(45) Date of Patent: May 21, 2013

(54) REDUCTION OF I/O LATENCY FOR WRITABLE COPY-ON-WRITE SNAPSHOT FUNCTION

(75) Inventor: Tomohiro Kawaguchi, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 325 days.

(21) Appl. No.: 12/711,643

(22) Filed: Feb. 24, 2010

(65) Prior Publication Data

US 2011/0208909 A1    Aug. 25, 2011

(51) Int. Cl.
G06F 12/00  (2006.01)
G06F 12/08  (2006.01)
G06F 12/16  (2006.01)

(52) U.S. Cl.
USPC .......... 711/163; 711/113; 711/162; 711/170; 711/E12.001; 711/E12.002; 711/E12.019

(58) Field of Classification Search
USPC ................. 711/163, 113, 162, 170, E12.001, 711/E12.002, E12.019
See application file for complete search history.

(56) References Cited

U.S. PATENT DOCUMENTS

| | | | |
|---|---|---|---|
| 7,103,713 B2 | 9/2006 | Saika et al. | |
| 7,113,945 B1 | 9/2006 | Moreshet et al. | |
| 7,171,511 B2 | 1/2007 | Yagawa | |
| 7,191,304 B1 | 3/2007 | Cameron et al. | |
| 7,434,264 B2* | 10/2008 | Moyer et al. | 726/28 |
| 2002/0112113 A1 | 8/2002 | Karpoff et al. | |
| 2006/0262441 A1* | 11/2006 | Kuhar et al. | 360/1 |
| 2007/0156985 A1* | 7/2007 | Tsai et al. | 711/162 |
| 2007/0276916 A1 | 11/2007 | McLoughlin et al. | |
| 2009/0271472 A1 | 10/2009 | Scheifler et al. | |

FOREIGN PATENT DOCUMENTS

EP    2104028 A2    9/2009

* cited by examiner

Primary Examiner — Yong Choe
(74) Attorney, Agent, or Firm — Mattingly & Malur, PC

(57) ABSTRACT

According to one aspect of the invention, a method of controlling a storage system comprises storing data in a first volume in the storage system which has volumes including the first volume and a plurality of second volumes; prohibiting write I/O (input/output) access against the first volume after storing the data in the first volume; performing subsequent write requests received by the storage system against the second volumes in the storage system after storing the data in the first volume, each write request having a target volume which is one of the second volumes; and in response to each one write request of the write requests, determining whether the target volume of the one write request is write prohibited or not, and performing the one write request only if the target volume is not write prohibited.

20 Claims, 23 Drawing Sheets

| RAID Gr. # | RAID Lv. | Disk# | Capacity | Pooled | Free Chunk Queue Index | Used Chunk Queue Index |
|---|---|---|---|---|---|---|
| 0 | 5 | 0-3 | 900[GB] | False | NULL | NULL |
| 1 | 5 | 4-7 | 3000[GB] | True | 7 | 15 |
| 2 | 5 | 8-11 | 3000[GB] | True | 2 | 3 |
| 3 | NULL | NULL | 0[GB] | NULL | NULL | NULL |
| 4 | NULL | NULL | 0[GB] | NULL | NULL | NULL |
| 5 | NULL | NULL | 0[GB] | NULL | NULL | NULL |
| 6 | 10 | 64-67 | 1500[GB] | True | 31 | 22 |
| 7 | 10 | 68-72 | 1500[GB] | True | 14 | 8 |

RAID Group Management Table

FIG. 3

| Vol# | Capacity | RAID Gr.# | Attribution | Chunk# | Address Range | Paired Vols |
|---|---|---|---|---|---|---|
| 0 | 10[GB] | 1 | Logical | 23 | 0x0000–0xFFFF | 1, 2, 3 |
| 1 | 10[GB] | NULL | Virtual | NULL | NULL | 0 |
| 2 | 10[GB] | NULL | Virtual | NULL | NULL | 0 |
| 3 | 10[GB] | NULL | Virtual | NULL | NULL | 0 |
| 4 | N/A | N/A | N/A | N/A | NULL | N/A |
| 5 | 60[GB] | NULL | Virtual | NULL | NULL | NULL |
| 6 | N/A | N/A | N/A | N/A | NULL | N/A |
| 7 | N/A | N/A | N/A | N/A | NULL | N/A |

Volume Management Table

FIG. 4

| Top LBA Addr. of Logical Vol. Page | RAID Gr. # | Top LBA Addr. of CoW Snapshot Pool Page |
|---|---|---|
| 0x0000 | NULL | NULL |
| 0x0100 | 14 | 0x0200 |
| 0x0200 | 18 | 0x0000 |
| 0x0300 | NULL | NULL |
| 0x0400 | 10 | 0x3200 |
| 0x0500 | NULL | NULL |
| 0x0600 | 10 | 0x1000 |

Virtual Volume Page Management Table

FIG. 5

| CoW Snapshot Pool Chunk# | Logical Volume# | Used Capacity | Deleted Capacity | Prev. Chunk Pointer | Next Chunk Pointer |
|---|---|---|---|---|---|
| 0 | 1 | 0 | 0kB | 7 | 2 |
| 1 | 10 | 2048kB | 1024kB | 2 | 3 |
| 2 | 33 | 8192kB | 768kB | 0 | 1 |
| 3 | 25 | 4096kB | 0kB | 1 | Null |
| 4 | N/A | 0 | 0 | 21 | 31 |

CoW Snapshot Pool Chunk Management Table
112-11-7

FIG. 6

CoW Snapshot Pool Page Management Table 112-11-8

| CoW Snapshot Pool Page Index 112-11-8-1 | Virtual Volume Page# 112-11-8-2 | Sharing Virtual Volumes 112-11-8-3 |
|---|---|---|
| 0 | 10 | 1 |
| 1 | 27 | 1, 3 |
| 2 | NULL | NULL |
| 3 | 13 | 2, 3 |

FIG. 7

| Index | Disk# | LBA | Next | Lock Status |
|---|---|---|---|---|
| 0 | 2 | 0xA00 | 1 | Shared/2 |
| 1 | 1 | 0x7E000 | 2 | Unlocked |
| 2 | 1 | 0x9700 | 3 | Unlocked |
| 3 | 0 | 0x0000 | NULL | Unlocked |
| 4 | 2 | 0xC500 | 5 | Shared/1 |
| 5 | 1 | 0x1100 | 6 | Exclusive |
| 6 | 1 | 0xFF00 | NULL | Unlocked |

112-14-1, 112-14-2, 112-14-3, 112-14-4, 112-14-7

| Kind of Queue | Pointer |
|---|---|
| Free | 2 |
| Clean | 1 |
| Dirty | 4 |

112-14-5, 112-14-6

Cache Management Table
112-14

FIG. 8

| 112-11-2-1 | 112-11-2-2 | 112-11-2-3 | 112-11-2-4 | 112-11-2-5 | 112-11-2-6 | 112-11-2-7 | 112-11-2'-8 |
|---|---|---|---|---|---|---|---|
| Vol# | Capacity | RAID Gr. # | Attribution | Chunk# | Address Range | Paired Vols | Write Status |
| 0 | 10[GB] | 1 | Logical | 23 | 0x0000-0xFFFF | 1, 2, 3 | Read-only |
| 1 | 10[GB] | NULL | Virtual | NULL | NULL | 0 | Writeable |
| 2 | 10[GB] | NULL | Virtual | NULL | NULL | 0 | Writeable |
| 3 | 10[GB] | NULL | Virtual | NULL | NULL | 0 | Writeable |
| 4 | N/A | N/A | N/A | N/A | NULL | N/A | NULL |
| 5 | 60[GB] | NULL | Virtual | NULL | NULL | NULL | Writeable |
| 6 | N/A | N/A | N/A | N/A | NULL | N/A | NULL |
| 7 | N/A | N/A | N/A | N/A | NULL | N/A | NULL |

112-11-2'

Virtual Volume Management Table

FIG. 19

REDUCTION OF I/O LATENCY FOR WRITABLE COPY-ON-WRITE SNAPSHOT FUNCTION

BACKGROUND OF THE INVENTION

The present invention relates generally to input/output (I/O) performance of storage subsystems in which a plurality of logical/virtual objects share less physical data and, more particularly, in the single instance, deduplication, or Copy-on-Write snapshot environment.

One of the functions of storage subsystem is the Writeable Copy-on-Write Snapshot function. The snapshot image consists of current data and its delta data from a snapshot point. When write I/O occurs to some data, the storage backs up the current data to a pool and overwrites the new data to the current data. When read I/O occurs to the snapshot (backed up) data, the storage searches the aforesaid backed up data in the pool and transfers the data, if the data is stored to the pool. When read I/O occurs to the snapshot (backed up) data, the storage searches the aforesaid backed up data in the primary volume and transfers the data if the data is stored to the primary volume. When write I/O occurs to the snapshot (backed up) data, the storage copies the primary volume data and merges the written data, if the data is not backed up yet. When write I/O occurs to the snapshot (backed up) data, the storage searches the aforesaid backed up data in the pool and overwrites the data if the data is not shared by other backup images. When write I/O occurs to the snapshot (backed up) data, the storage searches the aforesaid backed up data in the pool and stores the data to another area if the data is shared by other backup images. The above is the general control method of the Writeable Copy-on-Write Snapshot function.

The Writeable Copy-on-Write Snapshot function can reduce the physical capacity of the storage. It is efficient in many (physical or virtual) servers environment, because those servers will use the same data. However, this control method requires relatively long latency to ensure data consistency from the lock process and from the I/O synchronous copy against an I/O to backup image. For example, this control method requires reading I/O data of virtual volume during write I/O to logical volume.

BRIEF SUMMARY OF THE INVENTION

Exemplary embodiments of the invention provide a method and a system for modifying the writable copy-on-write snapshot function to achieve reduced I/O latency while preserving reduced physical capacity of the storage. The primary data ensures its read-only status. However, when a write operation occurs to a snapshot image, the storage does not perform the copy-on-write process and ignores the consistency protection method. Instead, the storage copies the primary data at an appropriate time later (asynchronously). In this way, the invention achieves high capacity efficiency and low latency I/O.

In accordance with an aspect of the present invention, a method of controlling a storage system comprises storing data in a first volume in the storage system which has volumes including the first volume and a plurality of second volumes; prohibiting write I/O (input/output) access against the first volume after storing the data in the first volume; performing subsequent write requests received by the storage system against the second volumes in the storage system after storing the data in the first volume, each write request having a target volume which is one of the second volumes; and in response to each one write request of the write requests, determining whether the target volume of the one write request is write prohibited or not, and performing the one write request only if the target volume is not write prohibited.

In some embodiments, the method further comprises setting a flag against a volume, indicating that write access to the volume is prohibited, wherein the determining includes checking whether the flag is set against the target volume. The method further comprises receiving, by the storage system, a read request for one second volume of the plurality of second volumes; and in response to the read request, providing an image of data obtained from the first volume and data transferred from the one second volume to a host computer. The second volumes are virtual volumes, which are allocated from a pool volume in units of pages in response to a write request, and writing to the pages in the second volumes for performing the subsequent write requests are performed asynchronously. Data for the subsequent write requests are written to a cache memory, and writing to the pages from the cache memory are performed before a dirty area of the cache memory reaches a predetermined threshold.

In specific embodiments, the subsequent write requests are for snapshot images. The subsequent write requests are sent from host computers; and each host computer corresponds to one of the second volumes. The method further comprises, if the second volumes are virtual volumes which are allocated from a pool volume in units of pages in response to a write request, and if a page has not been allocated for the target volume of the write request, running cache control to search cache area for related area of a paired logical volume which is paired with a virtual volume without locking the related area of the paired logical volume as exclusive status.

In some embodiments, the method further comprises: if data of the related area is stored in a cache area of the paired logical volume, copying the data from the cache area of the paired logical volume to a cache area of the virtual volume; if data of the related area is not stored in a cache area of the paired logical volume, copying the data from a disk of the paired logical volume to a cache area of the virtual volume; and changing a virtual volume cache area status of the virtual volume to "clean" without a need to unlock the related area of the paired logical volume.

In some embodiments, the method further comprises, if the second volumes are virtual volumes which are allocated from a pool volume in units of pages in response to a write request, and if a page has not been allocated for the target volume of the write request: allocating a snapshot pool page to a virtual volume page of a virtual volume; searching cache area for the related area of a paired logical volume which is paired with a virtual volume; checking whether data of the related area is stored in a cache area of the paired logical volume or not, and if yes, copying the data from the cache area of paired logical volume to a cache area of the allocated snapshot pool page, and if no, copying the data from a disk of logical volume area to a cache area of the allocated snapshot pool page; and changing the cache status of the copy-on-write snapshot page to "Dirty."

In specific embodiments, the data stored in the first volume is a Gold Image to be shared by all the host computers; each host computer is coupled with a corresponding second volume; and updates to each host computer are stored in the corresponding second volume.

Another aspect of the invention is directed to a storage system in an information system that includes a plurality of host computers coupled via a network to the storage system. The storage system comprises a processor; a memory; a storage which has volumes including a first volume and a plurality of second volumes; a storage controller configured to store data in the first volume in the storage system; prohibit write I/O access against the first volume after storing the data in the first volume; perform subsequent write requests received by the storage system against the second volumes in the storage system after storing the data in the first volume, each write request having a target volume which is one of the second volumes; and in response to each one write request of the write requests, determine whether the target volume of the one write request is write prohibited or not, and perform the one write request only if the target volume is not write prohibited.

Another aspect of the invention is directed to a computer-readable storage medium storing a plurality of instructions for controlling a data processor to process I/O (input/output) in an information system that includes a plurality of host computers coupled via a network to the storage system. The plurality of instructions comprises instructions that cause the data processor to store data in a first volume in the storage system which has volumes including the first volume and a plurality of second volumes; instructions that cause the data processor to prohibit write I/O access against the first volume after storing the data in the first volume; instructions that cause the data processor to perform subsequent write requests received by the storage system against the second volumes in the storage system after storing the data in the first volume, each write request having a target volume which is one of the second volumes; and instructions that cause the data processor to, in response to each one write request of the write requests, determine whether the target volume of the one write request is write prohibited or not, and performing the one write request only if the target volume is not write prohibited.

These and other features and advantages of the present invention will become apparent to those of ordinary skill in the art in view of the following detailed description of the specific embodiments.

BRIEF DESCRIPTION OF THE DRAWINGS

FIG. 3 shows an example of the RAID Group Management Table.

FIG. 4 shows an example of the Virtual Volume Management Table.

FIG. 5 shows an example of the Virtual Volume Page Management Table.

FIG. 6 shows an example of the Copy-on-Write Snapshot Pool Chunk Management Table.

FIG. 7 shows an example of the Copy-on-Write Snapshot Pool Page Management Table.

FIG. 8 shows an example of the Cache Management Table.

FIG. 19 shows an example of the Volume Management Table according to the specific embodiment.

DETAILED DESCRIPTION OF THE INVENTION

Figure 1A:
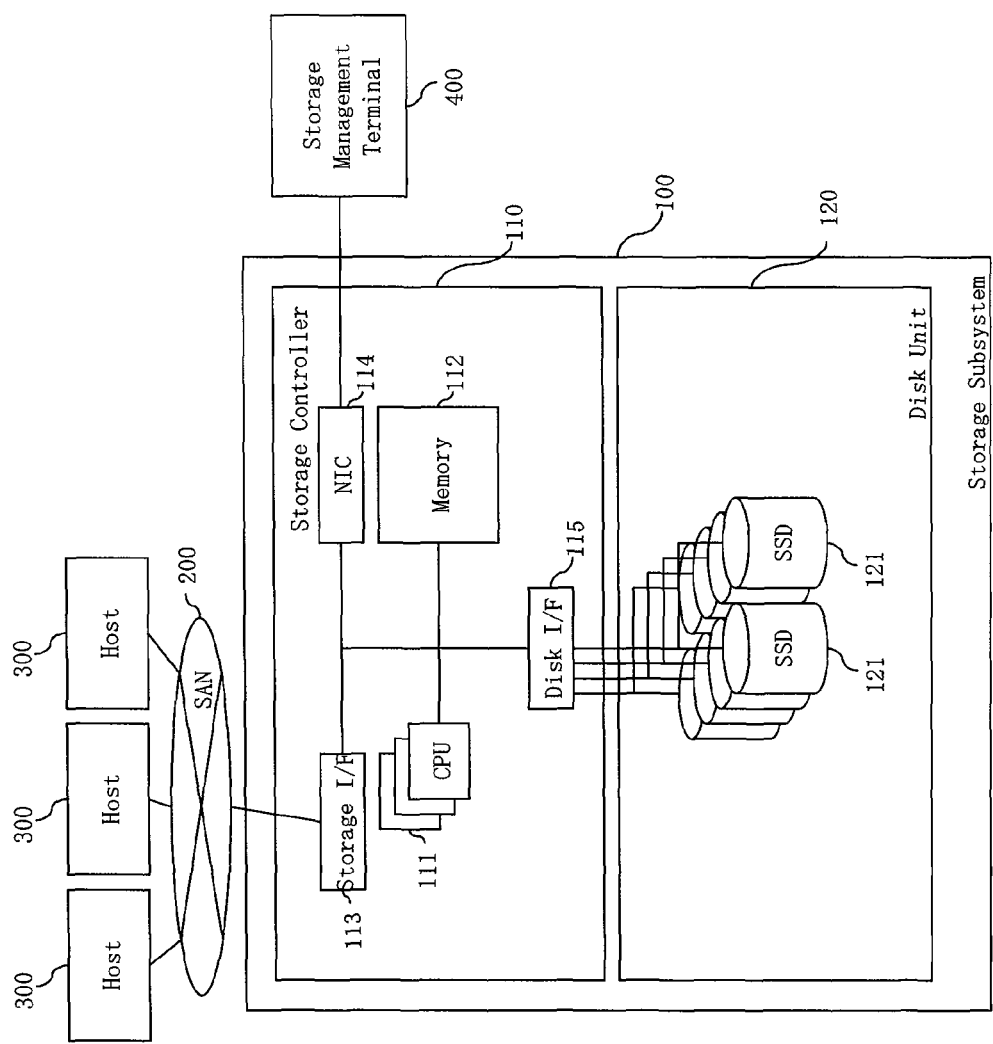
FIG. 1A illustrates an example of a hardware configuration of an information system in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for modifying the writable copy-on-write snapshot function to achieve reduced I/O latency while preserving reduced physical capacity of the storage.

System Configuration

FIG. 1A illustrates an example of a hardware configuration of an information system in which the method and apparatus of the invention may be applied. The system includes a storage subsystem 100, a storage network 200, host computers 30, and a storage management terminal 400.

The storage subsystem 100 includes a storage controller 110 having one or more CPUs 111, a memory 112, a storage interface 113, a local network interface 114, and disk interfaces 115. The CPUs 111 control the storage subsystem 100, and read programs and tables from the memory 112. When data is stored to the memory 112, it is required to lock the data to protect the data consistency. The storage interface 113 (e.g., Channel Interface) connects the storage subsystem 100 with the host computers 300 via the storage network 200. The local network interface 114 connects the storage subsystem 100 with the storage management terminal 400. The disk interfaces 115 connect the storage controller 110 with the disks 121. The disk unit 120 in the storage subsystem 100 stores the disks 121. The disks 121 store data. The disks 121 include flash memory, for example. The storage subsystem 100 may include different types of disks. The storage network 200 connects the storage subsystem 100 and the host computers 300. The host computers 300 send I/O requests to the storage subsystem 100 via the storage network 200, and send data to and receive data from the storage subsystem 100 via the storage network 200. The storage management terminal 400 provides user interface (e.g., for an administrator) to the storage subsystem 100, in order to manage the volume configuration, pool configuration, pair configuration and so on.

Figure 1B:
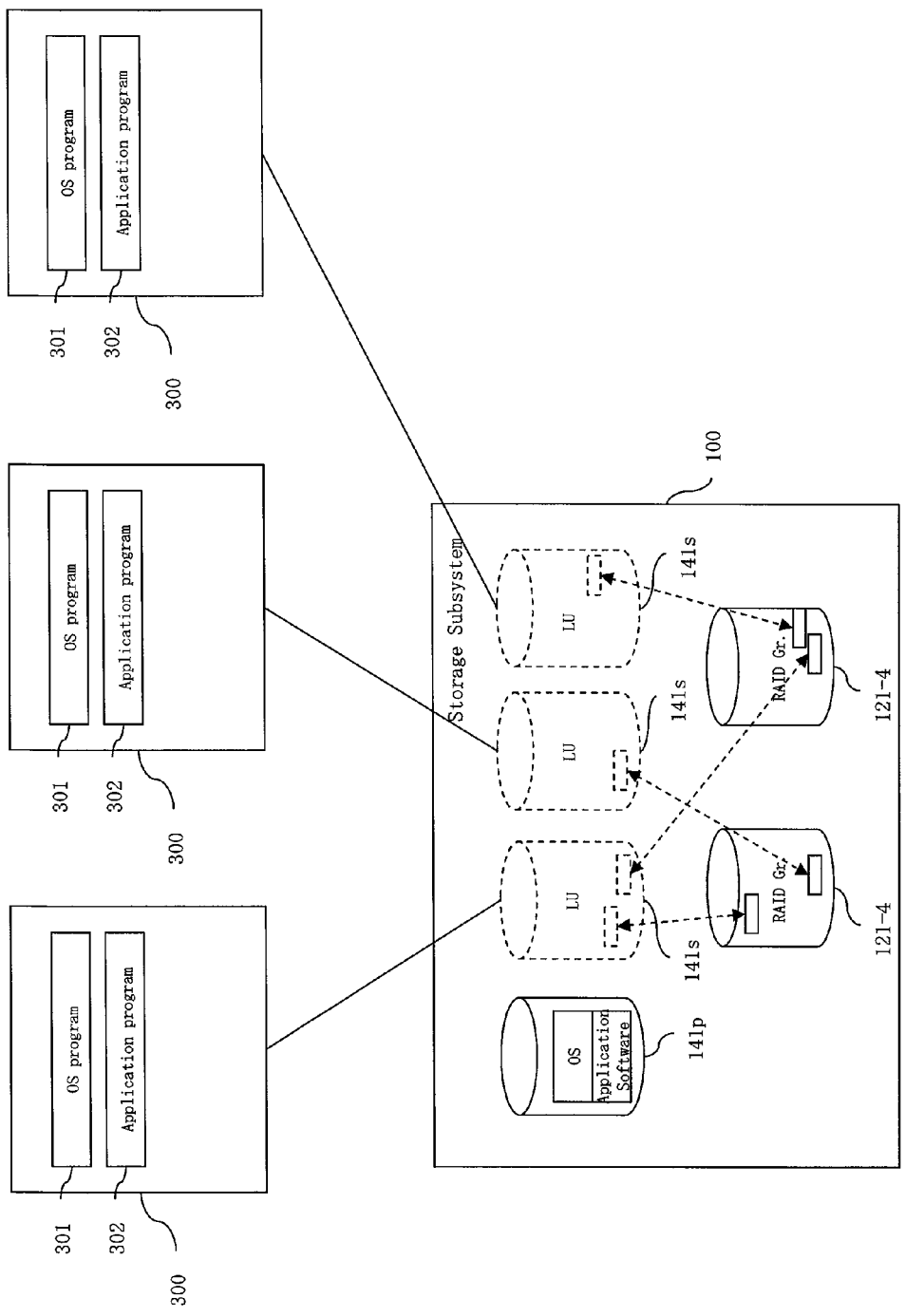
FIG. 1B illustrates an example of a logical system configuration of the information system of FIG. 1A.

FIG. 1B illustrates an example of a logical system configuration of the information system of FIG. 1A. The storage subsystem 100 includes volumes 141$p$ and 141$s$ and RAID groups 121-4. The primary volume 141$p$ and each secondary volume 141$s$ are established as a copy-on-write pair. The substance of the secondary volume 141$s$ is from the primary volume 141$p$. The user stores data to the primary volume 141$p$ before establishing the copy-on-write pairs. The written data for the secondary volume 141$s$ is stored to the RAID group 121-4. Each host computer 300 is connected to a corresponding secondary volume 141$s$. Each host computer 300 runs OS and application programs 301 and 302. The execution file, library file, and data file for programs 301 and 302 are read from the secondary volumes 141$s$. In a specific embodiment, the data stored to the primary volume 141$p$ may be a Gold Image to be shared by all the host computers 300, and updates to each host computer 300 are stored in the corresponding secondary volume 141$s$.

Figure 2:
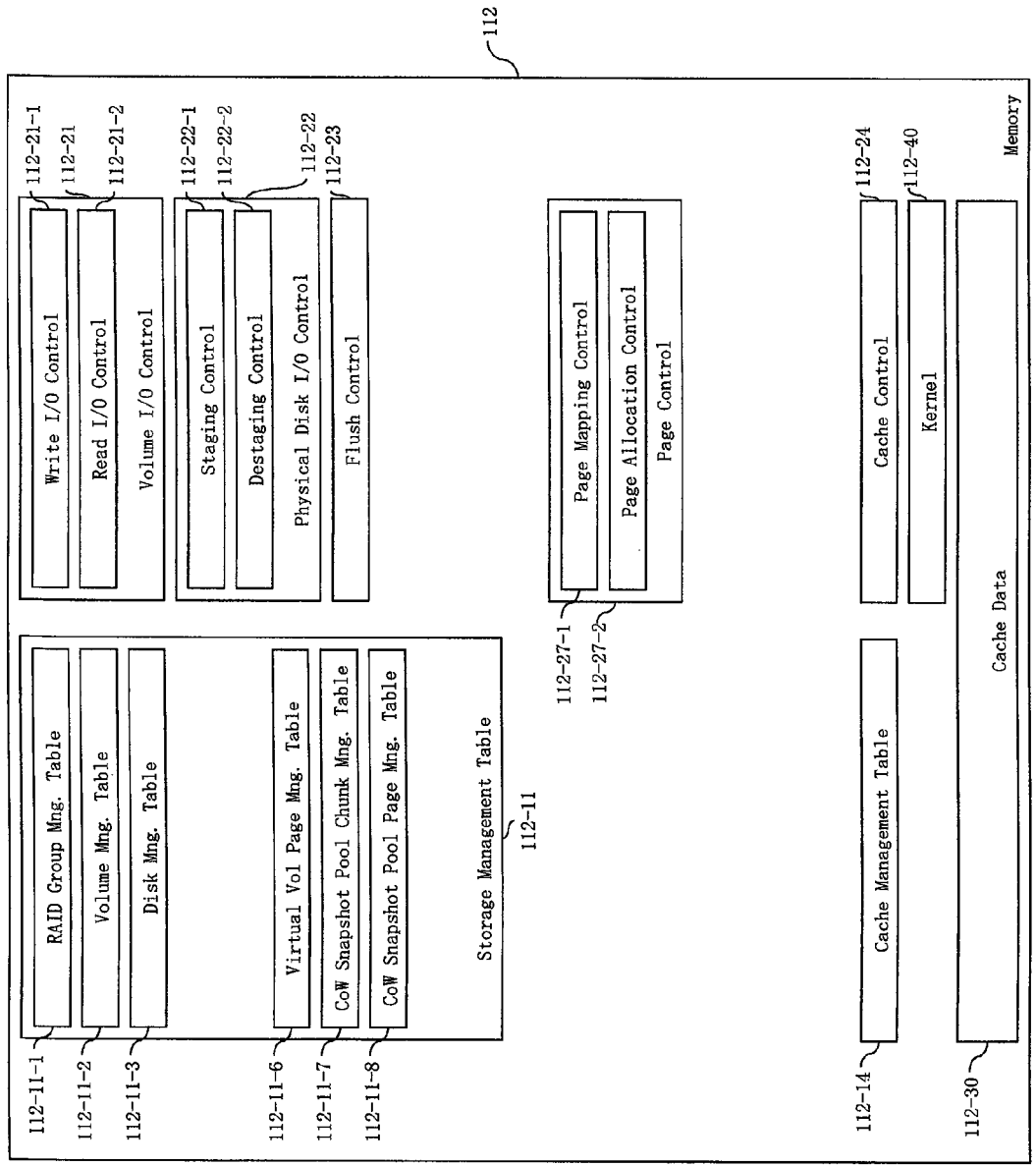
FIG. 2 illustrates an example of a memory in the storage subsystem of FIG. 1.

FIG. 2 illustrates an example of the memory 112 in the storage subsystem 100 of FIG. 1. A Storage Management Table 112-11 includes a RAID Group Management Table 112-11-1, a Volume Management Table 112-11-2, a Disk Management Table 112-11-3, a Virtual Volume Page Management Table 112-11-6, a Copy-on-Write Snapshot Pool Chunk Management Table 112-11-7, and a Copy-on-Write Snapshot Pool Page Management Table.

The RAID Group Management Table 112-11-1 is used for physical structure management for the disks 121 and those groups. The Volume Management Table 112-11-2 is used for volume configuration management. The Virtual Volume Page Management Table 112-11-6 is used for reference management from a partition of a virtual volume to a partition of a copy-on-write snapshot pool. The Copy-on-Write Snapshot Pool Chunk Management Table 112-11-7 is used for resource management of a copy-on-write snapshot pool, and for reference management from a copy-on-write snapshot pool page to a logical volume page. The Copy-on-Write Snapshot Pool Page Management Table 112-11-8 is used for resource management of a copy-on-write snapshot pool chunk.

The memory 112 includes a Cache Management Table 112-14 used for managing cache data in a Cache Data Area 112-30, and for LRU/MRU management. A Volume I/O Control 112-21 includes a Write I/O Control 112-21-1 and a Read I/O Control 112-21-2. The Write I/O control 112-21-1 runs by a write I/O requirement, and receives write data via the storage interface 113 and stores the data to the Cache Data Area 112-30. If the area requires backup of a data, the storage controller 110 runs a copy-on-write process. The Read I/O Control 112-21-2 runs by a read I/O requirement, and sends read data from the Cache Data Area 112-30 via the storage interface 113. If the volume is virtual and the area is not allocated a page, the CPU 111 reads from logical volume. A Physical Disk Control 112-22 includes a Staging Control 112-22-1 and a Destaging Control 112-22-2. The Staging Control 112-22-1 transfers data from the disks 121 to the Cache Data Area 112-30. The Destaging Control 112-22-2 transfers data from the Cache Data Area 112-30 to the disks 121. A Flush Control 112-23 periodically flushes dirty data in the Cache Data Area 112-30 to the disks 121. A Page Control 112-27 includes a Page Mapping Control 112-27-1 and a Page Allocation Control 112-27-2. The Page Mapping Control 112-27-1 searches a copy-on-write snapshot pool page to which a certain virtual page links. The Page Allocation Control 112-27-2 allocates a new copy-on-write snapshot pool page to a virtual volume page. A Cache Control 112-24 finds cached data in the Cache Data Area 112-30, and allocates a new cache area in the Cache Data Area 112-30. A Kernel 112-40 controls the schedules of running program. The Cache Data Area 112-30 stores read and write cache data, and is separated into plural cache slots.

Table Structures

FIG. 3 shows an example of the RAID Group Management Table 112-11-1. The table includes columns of RAID Group Number 112-11-1-1 specifying ID of the RAID group, RAID Level 112-11-1-2 specifying structure of RAID group ("N (=10, 5, 6, etc)" means "RAID Level is N"; "N/A" means the RAID group does not exist), Disk Number 112-11-1-3 specifying ID of the disks 121 belong to the RAID Group, RAID Group Capacity 112-11-1-4 specifying total capacity of the RAID group except redundant area, Pooled Status 112-11-1-5 specifying whether the RAID group joins a copy-on-write snapshot pool or is used for logical volumes ("True" means the RAID group joins a copy-on-write snapshot pool; "False" means the RAID Group does not join a copy-on-write snapshot pool and is used for logical volumes), Free Chunk Queue Index 112-11-1-7 for managing unused thin provisioning chunks, and Used Chunk Queue Index 112-11-1-8 for managing used thin provisioning chunks.

FIG. 4 shows an example of the Virtual Volume Management Table 112-11-2. The table includes columns of Volume Number 112-11-2-1 specifying ID of the volume, Volume Capacity 112-11-2-2 specifying capacity of the volume ("N/A" means the volume does not exist), Using RAID Group Number 112-11-2-3 specifying RAID Group ID which the logical volume uses, Volume Attribution 112-11-2-4 ("Logical" means the volume is a logical volume (a logical volume relates to some region of RAID group), "Virtual" means the volume is a virtual volume (a virtual volume refers to paired volume and pool volume for its data area), Using Chunk Number 112-11-2-5 specifying Chunk ID that the virtual volume currently uses (each page has a unique ID in the storage subsystem), Address Range 112-11-2-6 specifying related address range in a RAID group when the volume is a logical volume, and Paired Volume 112-11-2-7 specifying Paired Volume ID. If the volume is a virtual volume, it stores a paired logical volume ID. If the volume is a logical volume, it stores zero or more virtual volume IDs.

FIG. 5 shows an example of the Virtual Volume Page Management Table 112-11-6. The table has columns of Virtual Volume Page Index 112-11-6-1 specifying the top address of the virtual volume page, RAID Group Number 112-11-6-2 specifying RAID Group ID to which the virtual volume page belongs ("N/A" means no copy-on-write snapshot pool page is allocated to the virtual volume page), and Copy-on-write snapshot pool Page Index 112-11-6-3 specifying top address of a copy-on-write snapshot pool page to which the virtual volume page refers.

FIG. 6 shows an example of the Copy-on-Write Snapshot Pool Chunk Management Table 112-11-7. The table has columns of Copy-on-Write Snapshot Pool Chunk Number 112-11-7-1 specifying ID of the copy-on-write snapshot pool chunk, Logical Volume Number 112-11-7-2 specifying ID of a logical volume by which the copy-on-write snapshot pool chunk is referred, Used Capacity 112-11-7-3 specifying used capacity of the copy-on-write snapshot pool chunk, Deleted Capacity 112-11-7-4 specifying removed capacity of the copy-on-write snapshot pool chunk once the area has been used, Previous Chunk Number 112-11-7-5 specifying previous chunk pointer for queue management ("NULL" means a head of the queue), and Next Chunk Number 112-11-7-6 specifying next chunk pointer for queue management ("NULL" means a terminal of the queue).

FIG. 7 shows an example of the Copy-on-Write Snapshot Pool Page Management Table 112-11-8. The table includes columns of Copy-on-Write Snapshot Pool Page Index 112-11-8-1 specifying ID of the copy-on-write snapshot pool page, Virtual Volume Page Number 112-11-8-2 specifying ID of a virtual volume page by which the copy-on-write snapshot pool page is referred ("NULL" means the copy-on-write snapshot pool page is unused), and Virtual Volume Numbers 112-11-8-3 specifying IDs of virtual volumes which share the page.

FIG. 8 shows an example of the Cache Management Table 112-14. The table includes columns of Cache Slot Number 112-14-1 specifying ID of the cache slot in Cache Data Area 112-30, Disk Number 112-14-2 specifying ID of the disk 121 that the cache slot stores a data, Disk Address 112-14-3 specifying the disk address (e.g., LBA) that the cache slot stores a data, Next Slot Pointer 112-14-4 specifying next cache slot number for queue management ("NULL" means a terminal of the queue), Lock Status 112-14-7 specifying the lock status ("Shared" means the slot is being used by one or more processes with shared lock. When the status is "shared," the number of having lock process is also included. "Exclusive" means the slot is being used by one process with exclusive lock. "Unlocked" means no process uses the slot.), Kind of Queue Information 112-14-5 specifying the kind of cache slot queue ("Free" means a queue that has the unused cache slots. "Clean" means a queue that has cache slots that store the same data as the disk slots. "Dirty" means a queue that has cache slots that store different data from data in the disk slots, so that the storage controller 110 needs to flush the cache slot data to the disk slot in the future.), and Queue Index Pointer 112-14-6 specifying index of the cache slot queue.

Logical Structures

Figure 9:
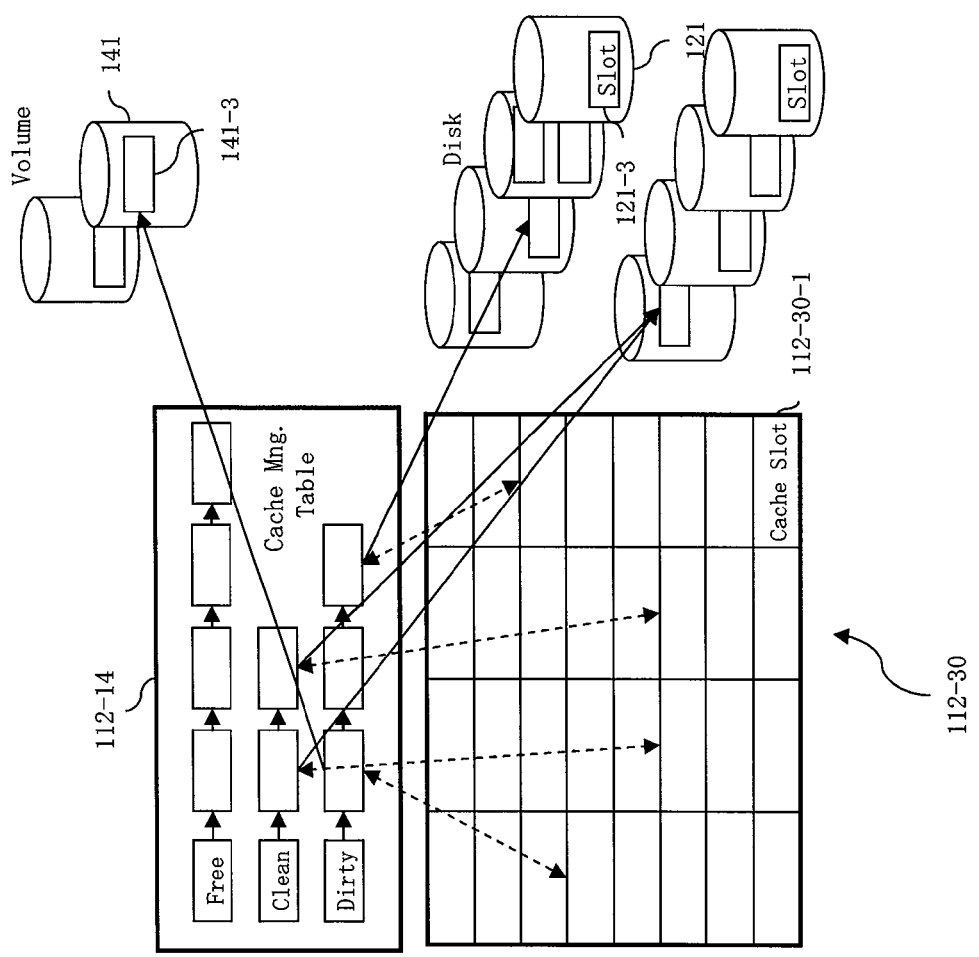
FIG. 9 shows an example illustrating the logical structure of the cache.

FIG. 9 shows an example illustrating the logical structure of the cache. For the arrowed lines, a dashed line means that an object refers by pointer and a solid line means that an object refers by calculation. The Cache Data Area 112-30 is divided into plural Cache Slots 112-30-1. The size of the Cache Slot 112-30-1 equals the size of Copy-on-Write Snapshot Pool Stripe 121-3 and the size of Virtual Volume Slot 141-3. The Cache Management Table 112-14 and the Cache Slot 112-30-1 are on a one-to-one relation. The Cache Management Table 112-14 refers to the Virtual Volume Slot 141-3 and it can resolve the Copy-on-Write Snapshot Pool Stripe 121-3 by the RAID Group Management Table 112-11-1. A plurality of cache data areas can share one Copy-on-Write Snapshot Pool Stripe 121-3.

Figure 10:
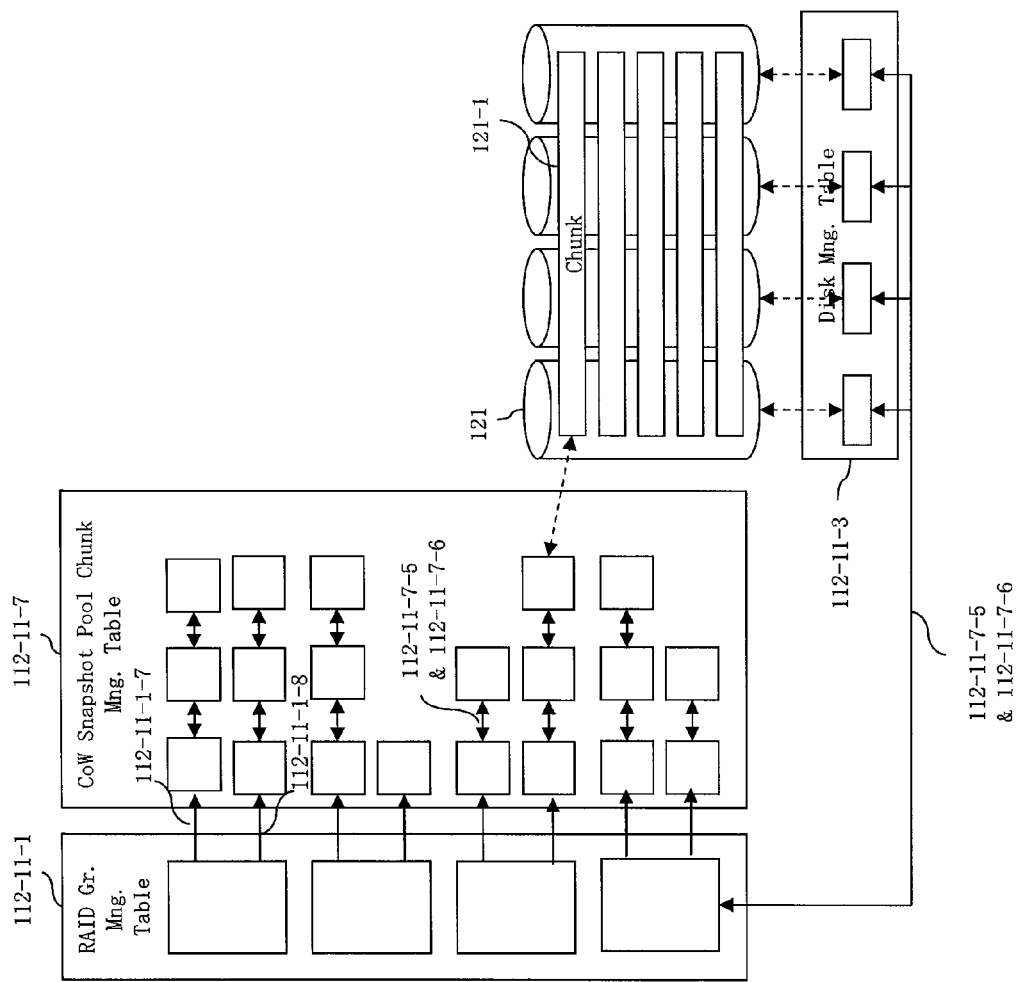
FIG. 10 shows an example illustrating the logical structure of a Copy-on-write Snapshot Pool Chunk.

FIG. 10 shows an example illustrating the logical structure of a Copy-on-write Snapshot Pool Chunk 121-1. For the arrowed lines, a solid line means that an object refers by pointer and a dashed line means that an object refers by calculation. The RAID Group Management Table 112-11-1 refers to the Disk Management Table 112-11-5 of belonged disks. The RAID Group Management Table 112-11-1 refers to the Copy-on-Write Snapshot Pool Chunk Management Table 112-11-7 by the Free Chunk Queue Index 112-11-1-7 and the Used Chunk Queue Index 112-11-1-8. The relation of the Copy-on-Write Snapshot Pool Chunks 121-1 and the Copy-on-Write Snapshot Pool Chunk Management Table 112-11-7 is fixed.

Figure 11:
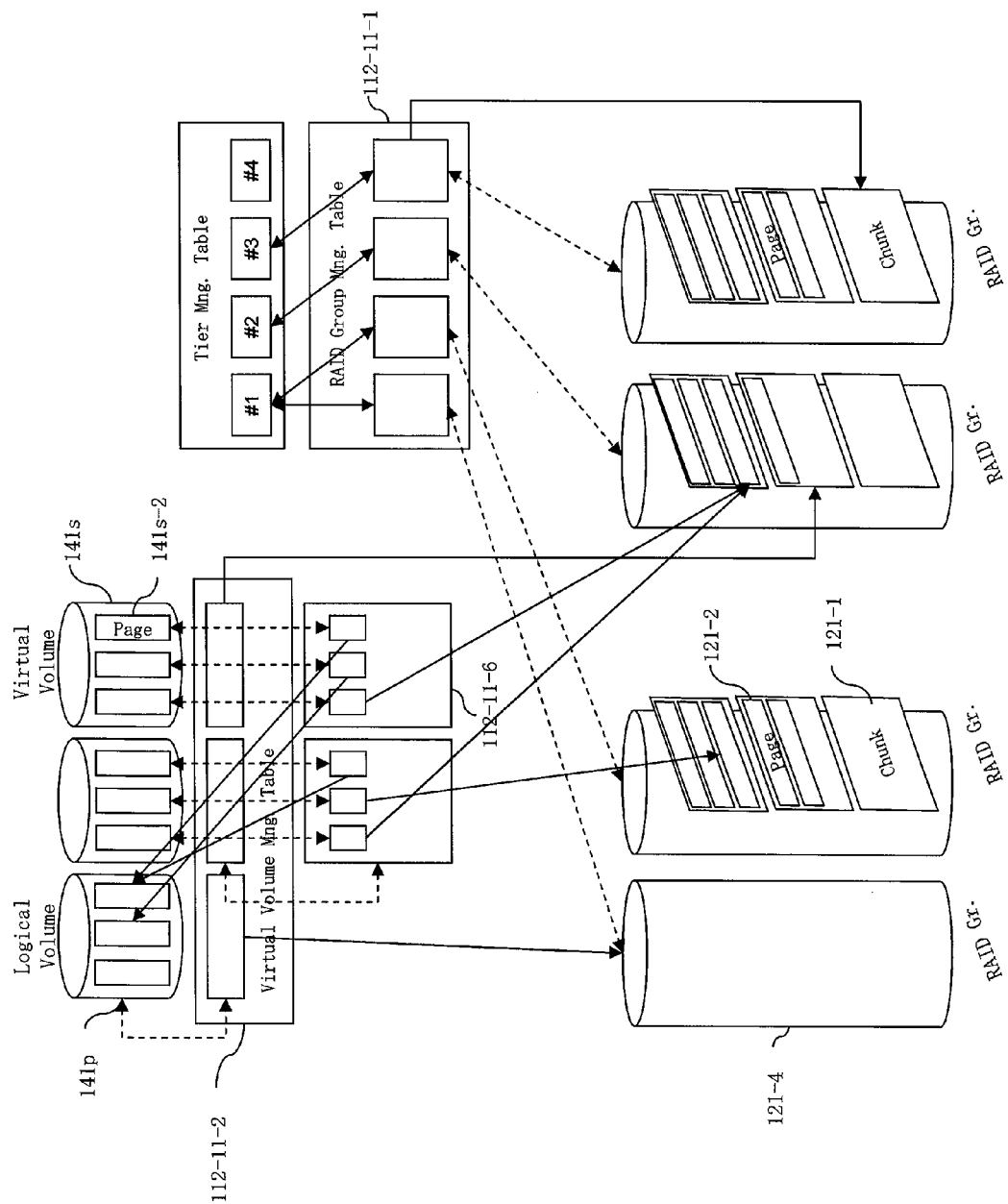
FIG. 11 shows an example illustrating the table reference structure toward copy-on-write snapshot pool.

FIG. 11 shows an example illustrating the table reference structure toward copy-on-write snapshot pool. For the arrowed lines, a solid line means that an object refers by pointer and a dashed line means that an object refers by calculation. The Virtual Volume 141s and the Volume Management Table 112-11-2 are on a one-to-one relation. The Volume Management Table 112-11-2 refers to the current using Copy-on-write Snapshot Pool Chunk 121-1. The Logical Volume 141p and the Volume Management Table 112-11-2 are on a one-to-one relation. The Volume Management Table 112-11-2 refers to the provisioned area on a RAID group. The Virtual Volume Page 141s-2 and the Virtual Volume Page Management Table 112-11-6 are on a one-to-one relation. The Virtual Volume Page Management Table 112-11-6 refers to a slice of the Copy-on-Write Snapshot Pool Pages 121-2, if a page is allocated. If a copy-on-write snapshot pool is not allocated, the page refers to the same address on the paired logical volume. The RAID group and the RAID Group Management Table 112-11-1 are on a one-to-one relation. The RAID Group Management Table 112-11-1 refers to used and unused Copy-on-Write Snapshot Pool Chunk 121-1 if the RAID group is joined to a copy-on-write snapshot pool.

Figure 12:
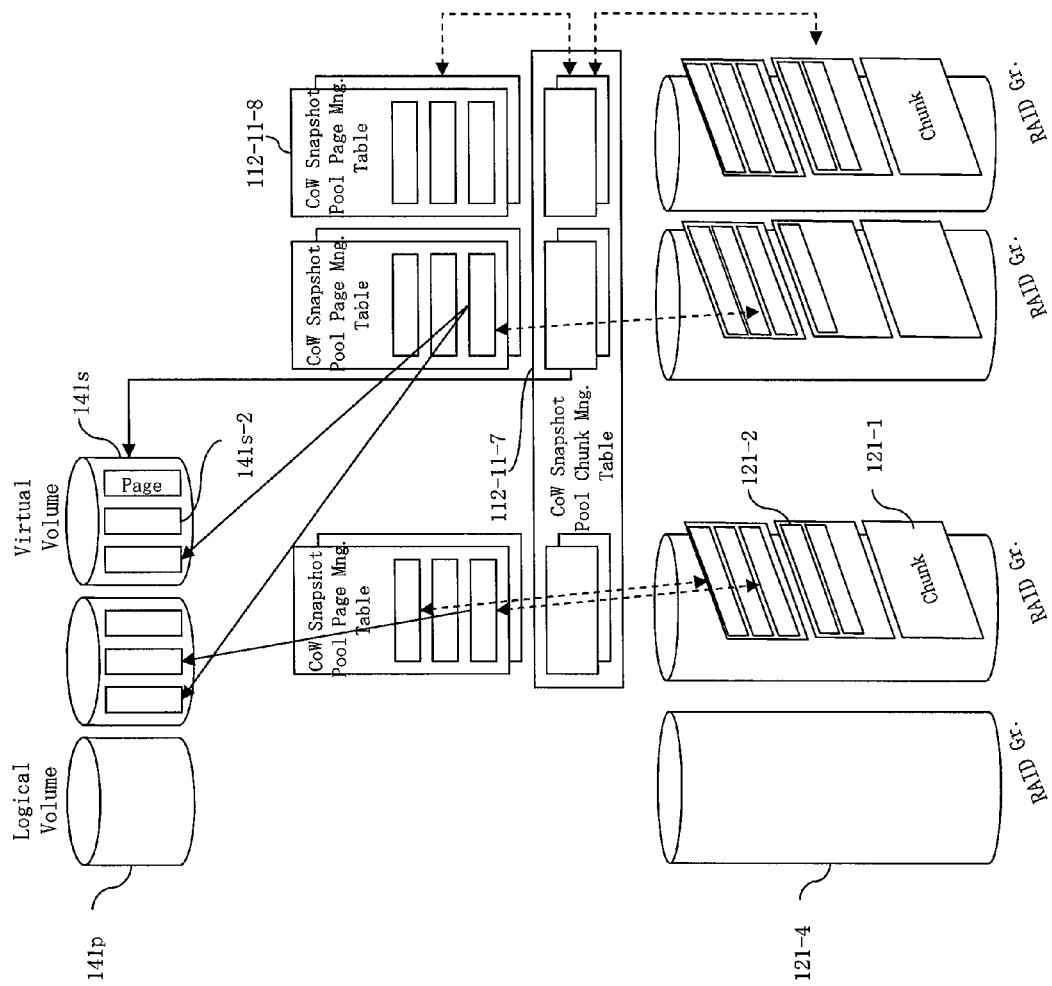
FIG. 12 shows an example illustrating the table reference structure toward virtual volumes.

FIG. 12 shows an example illustrating the table reference structure toward virtual volumes. For the arrowed lines, a solid line means that an object refers by pointer and a dashed line means that an object refers by calculation. The Copy-on-Write Snapshot Pool Chunk 121-1 and the Copy-on-Write Snapshot Pool Chunk Management Table 112-11-7 are on a one-to-one relation. The Copy-on-Write Snapshot Pool Chunk Management Table 112-11-7 refers to the Virtual Volume 141s. For the Copy-on-Write Snapshot Pool Pages 121-2, the Copy-on-Write Snapshot Pool Page Management Table 112-11-8 refers to the Virtual Volume Page 141s-2.

Flowcharts

Figure 13:
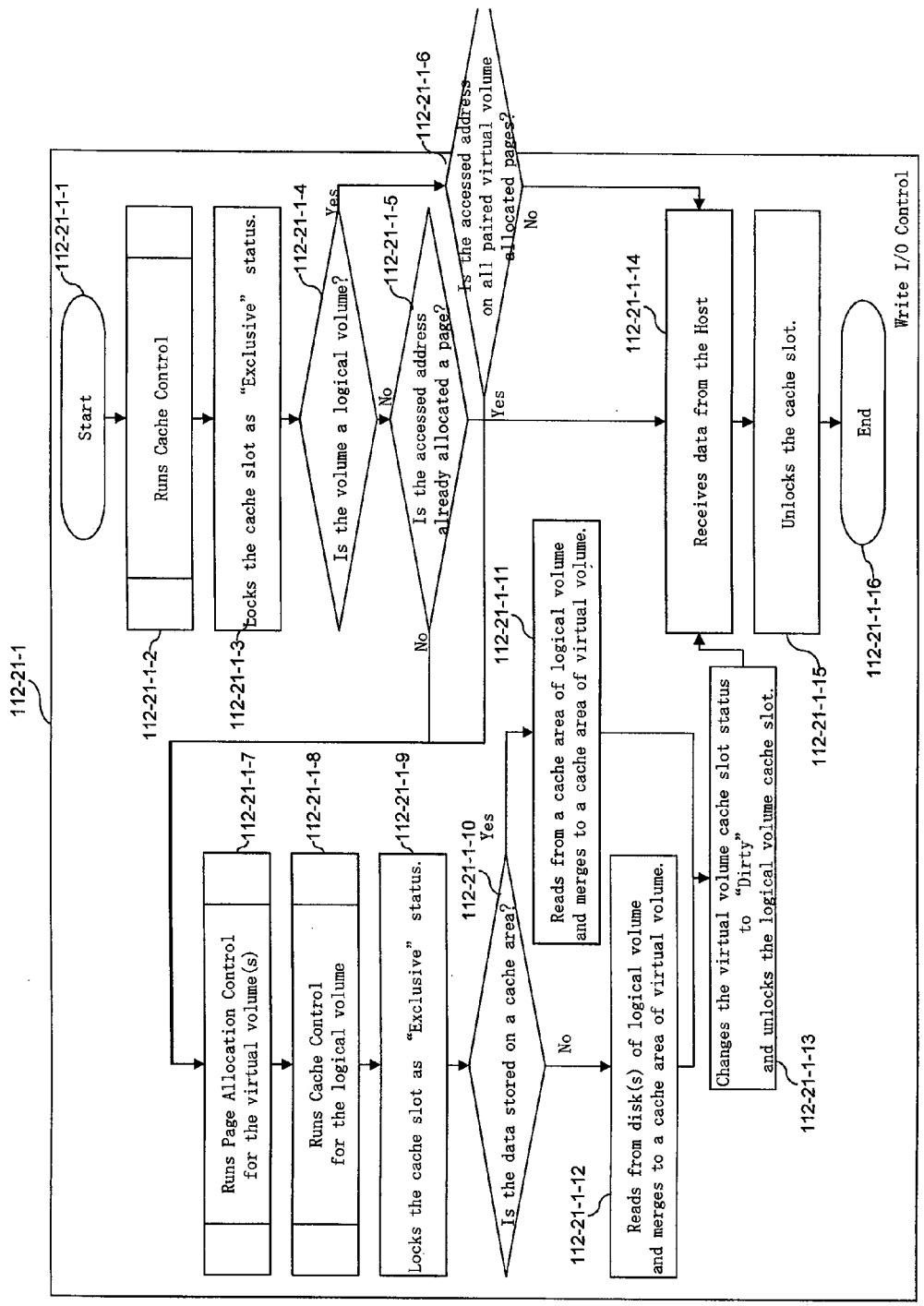
FIG. 13 shows an example of a flow diagram illustrating the Write I/O Control.

FIG. 13 shows an example of a flow diagram illustrating the Write I/O Control 112-21-1. The process starts at step 112-21-1-1. In step 112-21-1-2, the program calls the Cache Control 112-24 to search for the Cache Slot 112-30-1. In step 112-21-1-3, the program locks the found or allocated cache slot as "Exclusive" status. In step 112-21-1-4, the program checks the volume attribution. If the volume is a logical volume, the process proceeds to step 112-21-1-6. If the volume is not a logical volume, the process proceeds to step 112-21-1-5. In step 112-21-1-5, the program checks the allocation status of the virtual page of the virtual volume. If the accessed address is already allocated a page, the program proceeds to step 112-21-1-14. If not, the program proceeds to step 112-21-1-7. In step 112-21-1-6, the program checks the allocation status of the virtual pages of all virtual volumes which are paired with the same logical volume. If every virtual page refers to the copy-on-write snapshot pool page, the process proceeds to step 112-21-1-14. If not, the process proceeds to step 112-21-1-7.

In step 112-21-1-7, the program calls the Page Allocation Control 112-27-2 to allocate a new copy-on-write snapshot page. In step 112-21-1-8, the program calls the Cache Control 112-24 to search for the Cache Slot 112-30-1 of the newly allocated copy-on-write snapshot page and related logical volume area. In step 112-21-1-9, the program locks the found or allocated cache slots as "Exclusive" status. In step 112-21-1-10, the program checks whether the data is already staged into the cache area or not. If yes, the process proceeds to step 112-21-1-11. If no, the process proceeds to step 112-21-12. In step 112-21-1-11, the program copies the data from a cache area of the logical volume area to a cache area of the allocated copy-on-write snapshot pool page. In step 112-21-1-12, the program copies the data from a disk of the logical volume area to a cache area of the allocated copy-on-write snapshot pool page. Next, in step 112-21-1-13, the program changes the cache status of the copy-on-write snapshot page to "Dirty," and unlocks the cache area of the copy-on-write snapshot page. If the accessed volume is "virtual," the program unlocks the cache area of the aforesaid logical volume area, and replaces the cache area address from that of the copy-on-write snapshot page to that of the virtual volume page.

In step 112-21-1-14, the program receives the write I/O data from the host computer 300 and stores it to the aforesaid Cache Slot 112-30-1. In step 112-21-1-15, the program unlocks the cache area of the accessed volume. The process ends at step 112-21-1-16.

Figure 14:
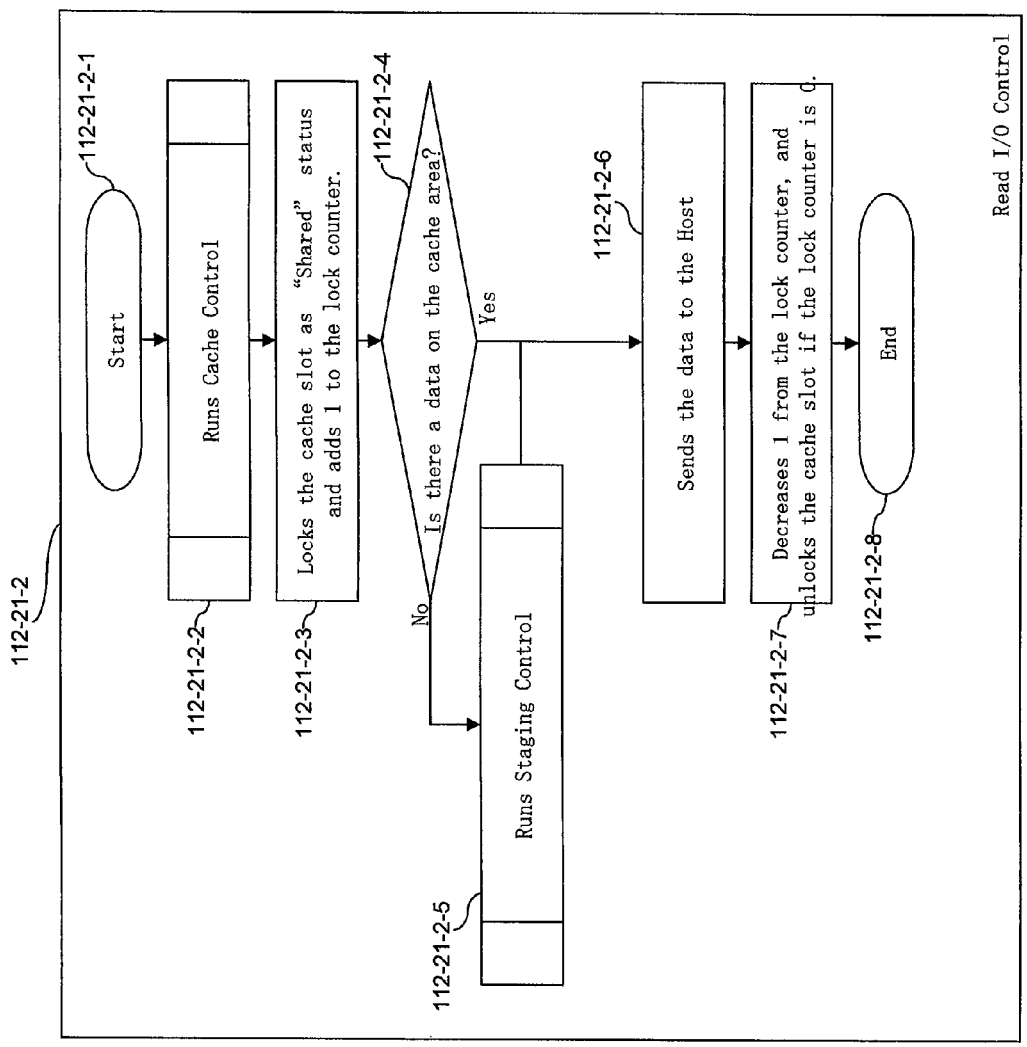
FIG. 14 shows an example of a flow diagram illustrating the Read I/O Control.

FIG. 14 shows an example of a flow diagram illustrating the Read I/O Control 112-21-2. The process starts at step 112-21-2-1. In step 112-21-2-2, the program calls the Cache Control 112-24 to search for the Cache Slot 112-30-1. In step 112-21-2-3, the program locks the cache area as "Shared" status and increases the lock counter. In step 112-21-2-4, the program checks the status of the aforesaid Cache Slot 112-30-1 to determine whether the data has already been stored there or not. If yes, the process proceeds to step 112-21-2-6. If no, the process proceeds to step 112-21-2-5. In step 112-21-2-5, the program calls the Staging Control 112-22-1 and continues to step 112-21-2-6. In step 112-21-2-6, the program transfers the data of the Cache Slot 112-30-1 to the host computer 300. In step 112-21-2-7, the program decreases the lock counter by one and unlocks the cache area as "Shared" status if the lock counter is 0. The process ends at step 112-21-2-8.

Figure 15:
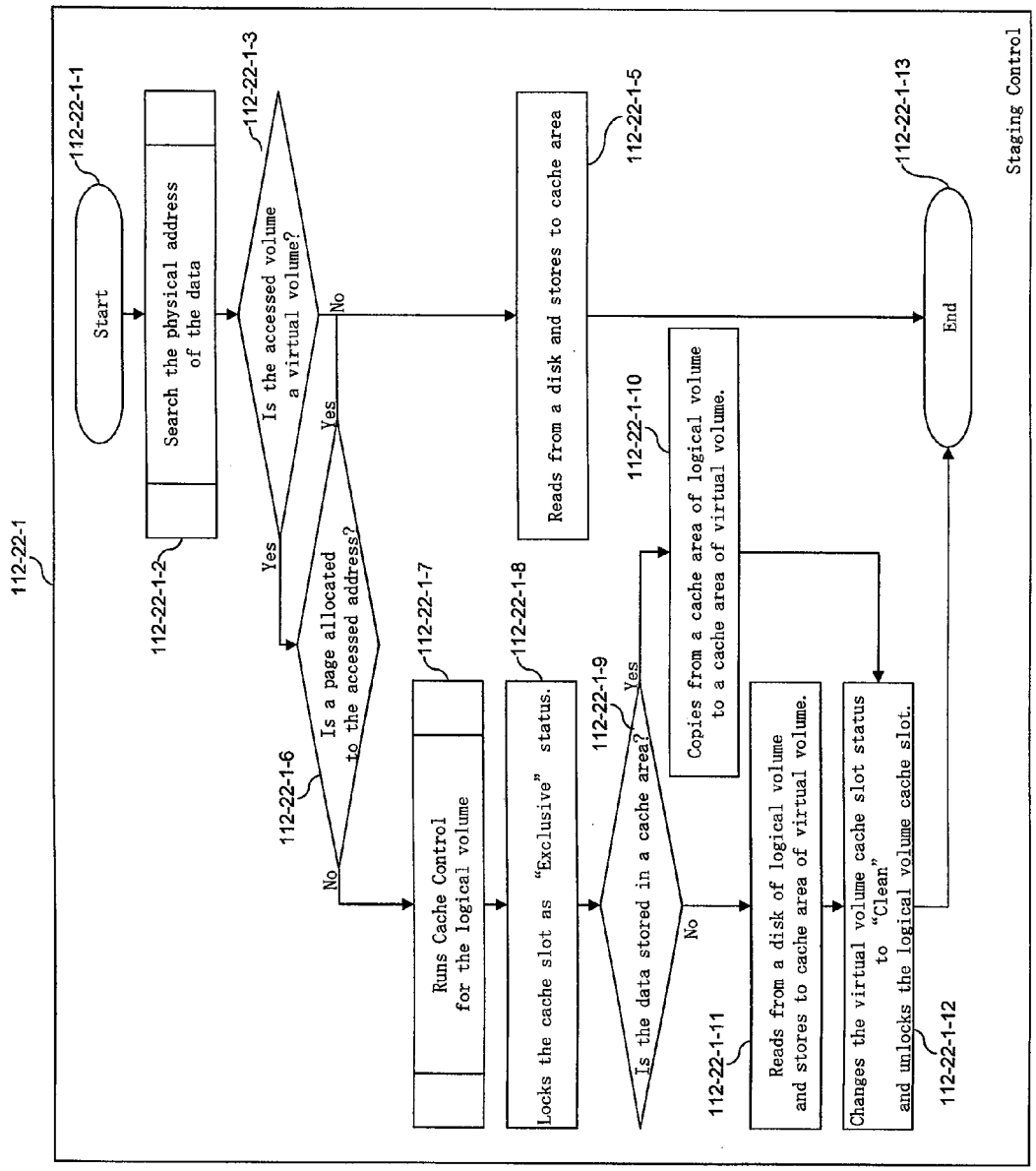
FIG. 15 shows an example of a flow diagram illustrating the Staging Control.

FIG. 15 shows an example of a flow diagram illustrating the Staging Control 112-22-1. The process starts at step 112-22-1-1. In step 112-22-1-2, the program checks the Volume Management Table 112-11-2 and calls the Page Mapping Control 112-27-1 to search for a logical volume address or copy-on-write snapshot pool page for the virtual volume page. In step 112-22-1-3 checks the attribution of the accessed volume to determine whether it is a virtual volume or not. If yes, the process proceeds to step 112-22-1-6. If no, the process proceeds to step 112-22-1-5. In step 112-22-1-5, the program reads data from an area of the disk 121 and stores it to the Cache Data Area 112-30. The program informs the write I/O completion to the host 300 and the process ends at step 112-22-1-13.

In step 112-22-1-6, the program checks whether the virtual volume page refers to a copy-on-write snapshot pool page (i.e., whether a page is allocated to the accessed address). If yes, the process proceeds to step 112-22-1-5. If no, the process proceeds to step 112-22-1-7. In step 112-22-1-7, the program calls the Cache Control 112-24 to search for the Cache Slot 112-30-1 for related area of the paired logical volume. In step 112-22-1-8, the program locks the related area of the paired logical volume. In step 112-22-1-9, the program checks whether the data of the area is stored in the cache area or not. If yes, the process proceeds to step 112-22-1-10. If no, the process proceeds to step 112-22-1-11. In step 112-22-1-10, the program copies the data from a cache area of logical volume area to a cache area of the allocated copy-on-write snapshot pool page. In step 112-22-1-11, the program copies the data from a disk of logical volume area to a cache area of the allocated copy-on-write snapshot pool page. Next, in step 112-21-1-12, the program changes the cache status of copy-on-write snapshot page to "Clean," unlocks the cache area of aforesaid logical volume area, and replaces the cache area address from that of the copy-on-write snapshot page to that of the virtual volume page. The program informs the read I/O completion to the host 300 and the process ends at step 112-22-1-13.

Figure 16:
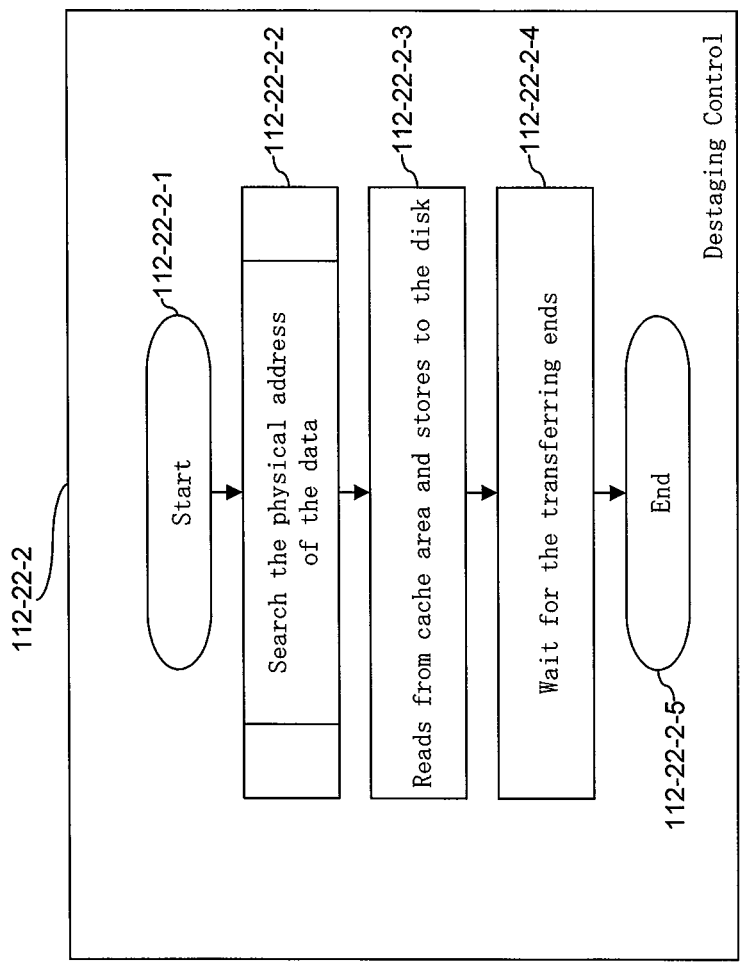
FIG. 16 shows an example of a flow diagram illustrating the Destaging Control.

FIG. 16 shows an example of a flow diagram illustrating the Destaging Control 112-22-2. The process starts at step 112-22-2-1. In step 112-22-2-2, the program calls the Page Mapping Control 112-27-1 to search for or allocate a copy-on-write snapshot pool page for the virtual volume page. In step 112-22-2-3 the program reads data from a slot in the Cache Data Area 112-30 and stores it to the disk 121. In step 112-22-2-4, the program waits until the data transfer ends. The process ends at step 112-22-2-5.

Figure 17:
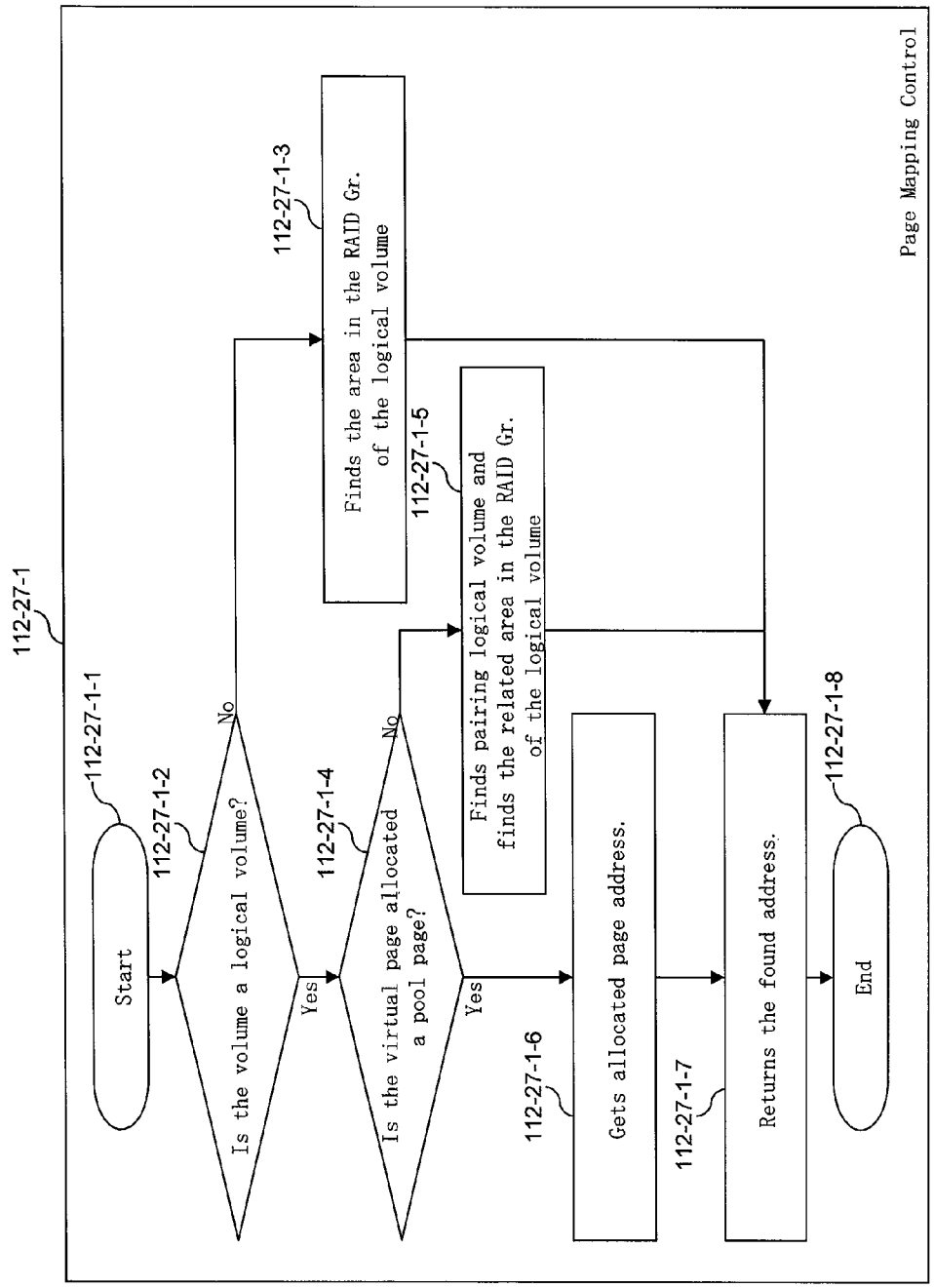
FIG. 17 shows an example of a flow diagram illustrating the Page Mapping Control.

FIG. 17 shows an example of a flow diagram illustrating the Page Mapping Control 112-27-1. The process starts at step 112-27-1-1. In step 112-27-1-2, the program checks the volume attribution by referring to the Volume Management Table 112-11-2. If the volume is a logical volume, the process proceeds to step 112-27-1-4. If the volume is not a logical volume, the process proceeds to step 112-27-1-3. In step 112-27-1-3, the program calculates the accessed area in the RAID group, and the process proceeds to step 112-27-1-7. In step 112-27-1-4, the program checks whether the virtual volume page already is allocated a copy-on-write snapshot pool page or not. If yes, the process proceeds to step 112-27-1-6. If no, the process proceeds to step 112-27-1-5. In step 112-27-1-5, the program calculates the related area of the accessed area in the paired logical volume, and the process proceeds to step 112-27-1-7. In step 112-27-1-6, the program gets the allocated copy-on-write snapshot pool page address. Next, in step 112-27-1-7, the program returns the found address. The process ends at step 112-27-1-8.

In the above description for a general technology embodiment, the Writeable Copy-on-Write Snapshot function can reduce the physical capacity of the storage. The control method requires ensures data consistency from the lock process and from the I/O synchronous copy against an I/O to backup image. The lock process employs a comparative method. The specific embodiment of the invention described below does not perform the copy-on-write process and ignores the consistency protection method. Instead, the storage copies the primary data at an appropriate time later (asynchronously). In this way, the invention achieves high capacity efficiency and low latency I/O.

Specific Embodiment Ignoring Consistency Protection

With regard to the specific embodiment, only differences with the general technology embodiment described above are discussed. The following description is directed only to a logical volume that is read-only.

Figure 18:
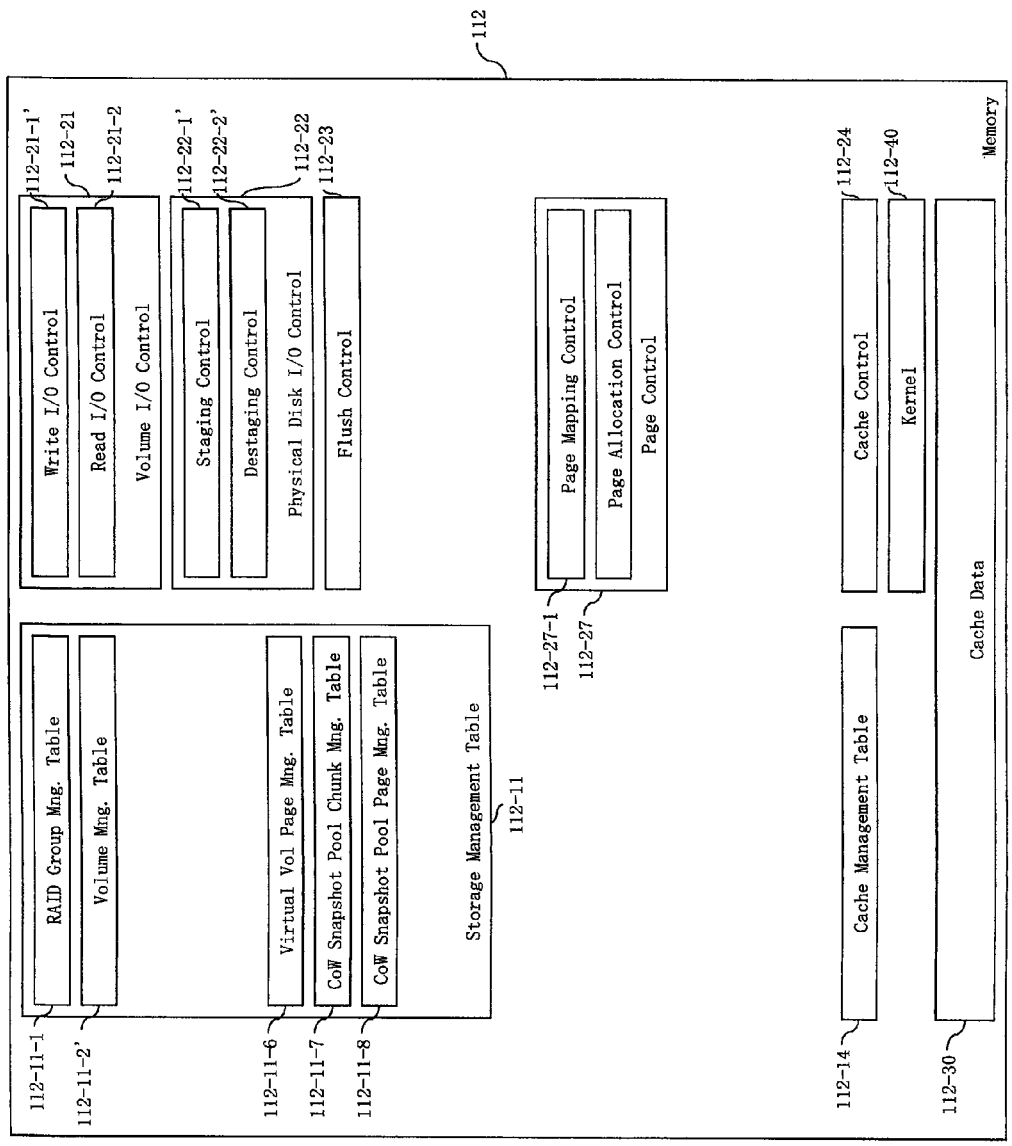
FIG. 18 shows an example of the memory in the storage subsystem according to a specific embodiment ignoring consistency protection.

In terms of the system configuration, FIG. 18 shows an example of the memory 112 in the storage subsystem according to the specific embodiment. The Volume Management Table 112-11-2' is for volume configuration management which has a write status. The Write I/O Control 112-21-1' is only for virtual volume access because access to a logical volume is read-only. The Staging Control 112-22-1' transfers data from the disks 121 to the Cache Data Area 112-30. The Destaging Control 112-22-2' transfers data from the Cache Data Area 112-30 to the disks 121.

In terms of the table structure, FIG. 19 shows an example of the Volume Management Table 112-11-2' according to the specific embodiment. A column of Write Status 112-11-2'-8 specifies the access permission of the volume. "Read-only" means the volume does not accept a write I/O. "Writeable" means the volume accepts a write I/O. A storage user can set this status via the Storage Management Terminal 400. In this case, read-only is ensured by this method. However, it can be used by other methods such as, for example, path termination.

Figure 20:
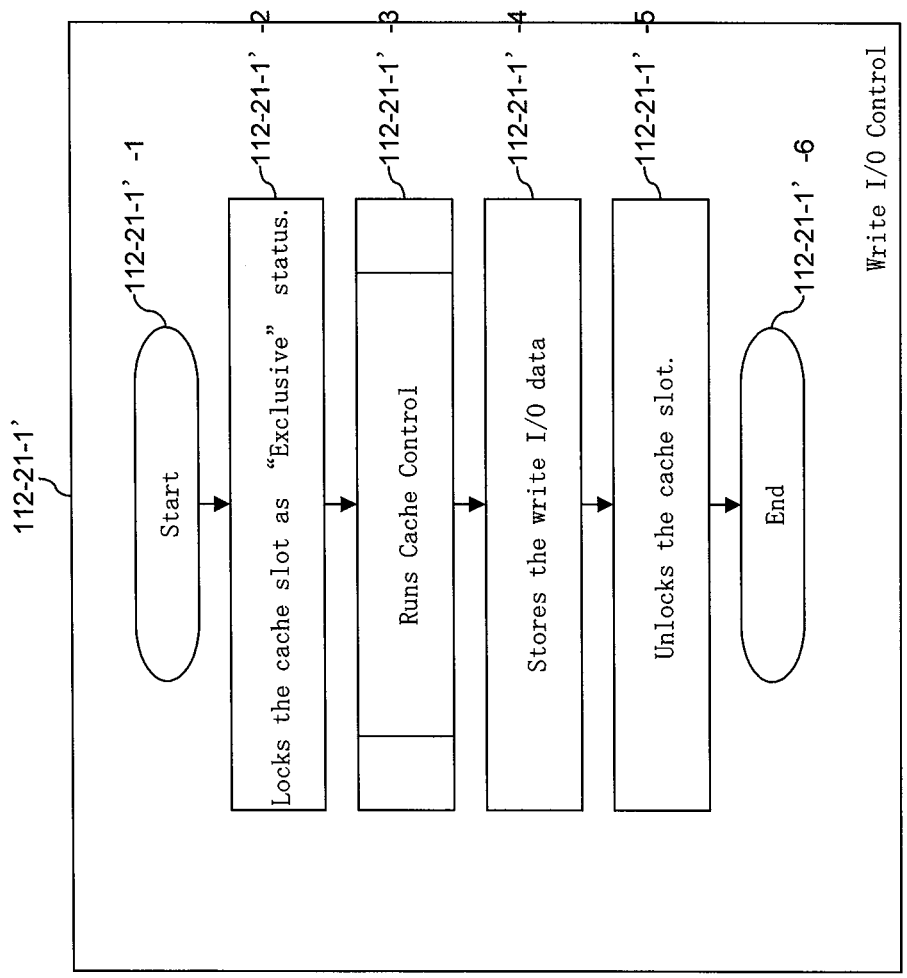
FIG. 20 shows an example of a flow diagram illustrating the Write I/O Control according to the specific embodiment.

In terms of flowchart, FIG. 20 shows an example of a flow diagram illustrating the Write I/O Control 112-21-1' according to the specific embodiment. The process starts at step 112-21-1'-1. In step 112-21-1'-2, the program locks the accessed area as "Exclusive" status. In step 112-21-1'-3, the program calls the Cache Control 112-24 to search for the Cache Slot 112-30-1. In step 112-21-1'-4, the program receives the write I/O data and stores it to the cache area. In step 112-21-1'-5, the program unlocks the accessed area. The program ends at step 112-21-1'-6.

Figure 21:
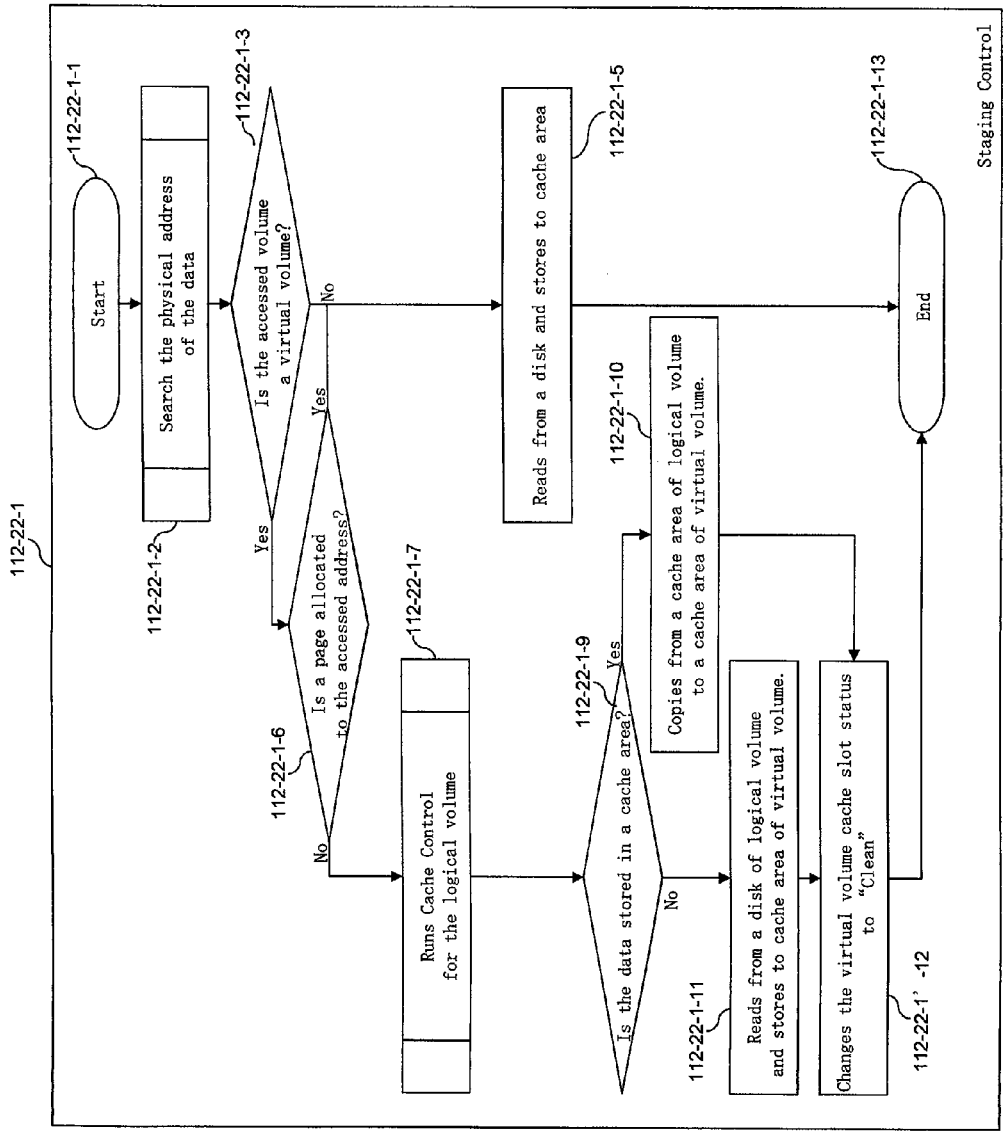
FIG. 21 shows an example of a flow diagram illustrating the Staging Control according to the specific embodiment.

FIG. 21 shows an example of a flow diagram illustrating the Staging Control 112-22-1' according to the specific embodiment. As compared to FIG. 15, step 112-22-1-8 is removed. In step 112-22-1'-12 (replacing step 112-22-1-12), the program changes the cache status of the copy-on-write snapshot page to "Clean."

Figure 22:
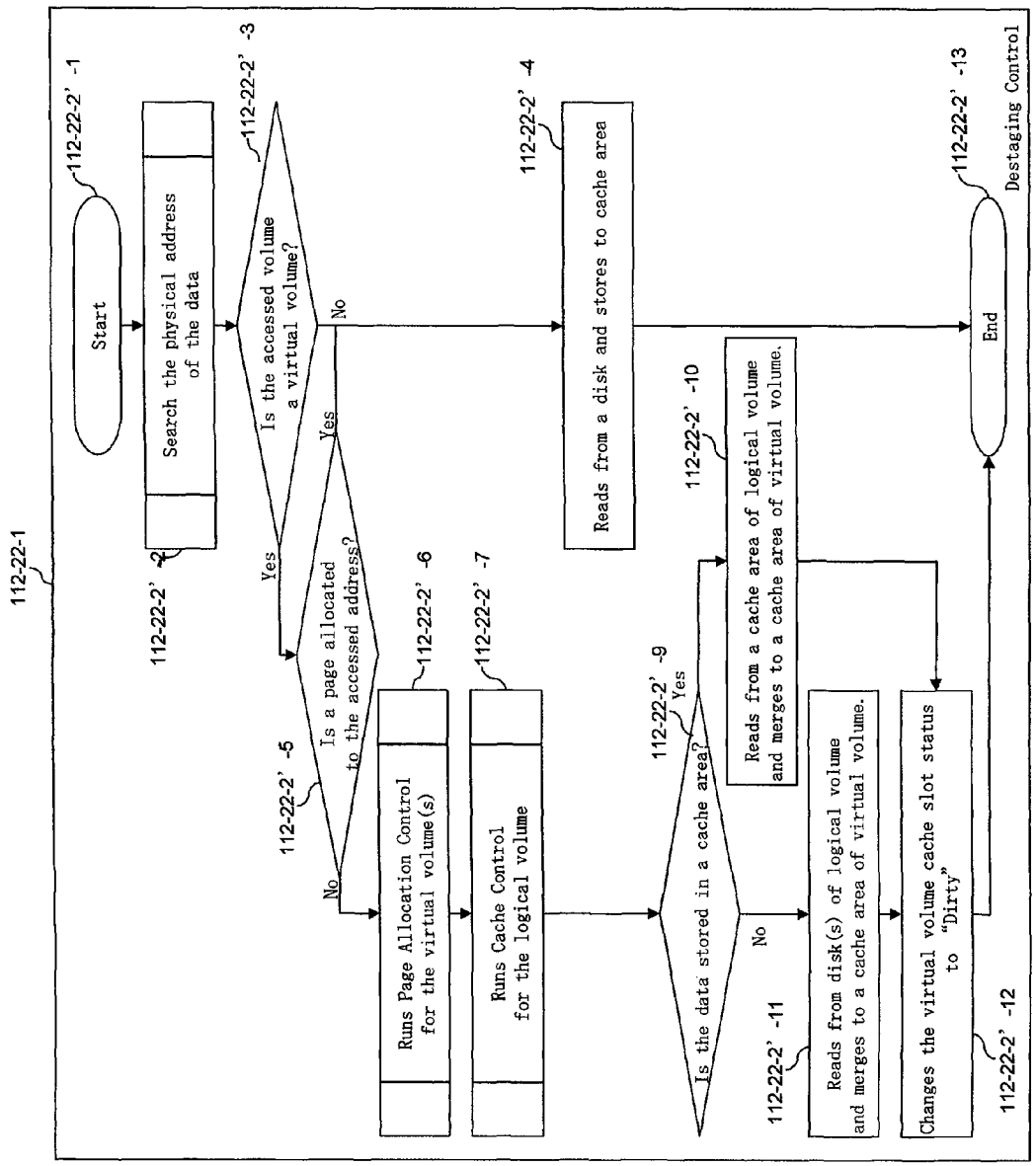
FIG. 22 shows an example of a flow diagram illustrating the Destaging Control according to the specific embodiment.

FIG. 22 shows an example of a flow diagram illustrating the Destaging Control 112-22-2' according to the specific embodiment. The process starts at step 112-22-2'-1. In step 112-22-2'-2, the program checks the Volume Management Table 112-11-2 and calls the Page Mapping Control 112-27-1 to search for a logical volume address or copy-on-write snapshot pool page for the virtual volume page. In step 112-22-2'-3, the program checks the attribution of the accessed volume. If the accessed volume is a virtual volume, the process proceeds to step 112-22-2'-5. If the accessed volume is not a virtual volume, the process proceeds to step 112-22-2'-4. In step 112-22-2'-4, the program reads data from a disk 121 and stores it to the Cache Data Area 112-30, and the process ends at step 112-22-2'-13. In step 112-22-2'-5, the program checks whether a page is allocated to the accessed address. If yes, the process proceeds to step 112-22-2'-4. If no, the process proceeds to step 112-22-2'-6. In step 112-22-2'-6, the program calls the Page Allocation Control 112-27-2 to allocate a snapshot pool page to the virtual volume page. In step 112-22-2'-7, the program calls the Cache Control 112-24 to search for the Cache Slot 112-30-1 for related area of the paired logical volume. In step 112-22-2'-9, the program checks whether the data of the area is stored in the cache area or not. If yes, the process proceeds to step 112-22-2'-10. If no, the process proceeds to step 112-22-2'-11. In step 112-22-2'-10, the program copies the data from a cache area of logical volume area to a cache area of the allocated copy-on-write snapshot pool page. In step 112-22-2'-11, the program copies the data from a disk of logical volume area to a cache area of the allocated copy-on-write snapshot pool page. Next, in step 112-22-2'-12, the program changes the cache status of the copy-on-write snapshot page to "Dirty." The process ends at step 112-22-2'-13.

Of course, the system configuration illustrated in FIG. 1 is purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for modifying the writable copy-on-write snapshot function to achieve reduced I/O latency while preserving reduced physical capacity of the storage. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A method of controlling a storage system, the method comprising:
    storing data in a first volume in the storage system which has volumes including the first volume and a plurality of second volumes;
    prohibiting write I/O (input/output) access against the first volume after storing the data in the first volume;
    performing subsequent write requests received by the storage system against the second volumes in the storage system after storing the data in the first volume, each write request having a target volume which is one of the second volumes; and
    in response to each one write request of the write requests, determining whether the target volume of the one write request is write prohibited or not, and performing the one write request only if the target volume is not write prohibited;
    wherein the second volumes are virtual volumes, which are allocated from a pool volume in units of pages in response to a write request, and wherein writing to the pages in the second volumes for performing the subsequent write requests are performed asynchronously.

2. The method according to claim 1, further comprising:
    setting a flag against a volume, indicating that write access to the volume is prohibited,
    wherein the determining includes checking whether the flag is set against the target volume.

3. The method according to claim 1, further comprising:
    receiving, by the storage system, a read request for one second volume of the plurality of second volumes; and
    in response to the read request, providing an image of data obtained from the first volume and data transferred from the one second volume to a host computer.

4. The method according to claim 1,
    wherein data for the subsequent write requests are written to a cache memory, and
    wherein writing to the pages from the cache memory are performed before a dirty area of the cache memory reaches a predetermined threshold.

5. The method according to claim 1,
    wherein the subsequent write requests are for snapshot images.

6. The method according to claim 1,
    wherein the subsequent write requests are sent from host computers; and
    wherein each host computer corresponds to one of the second volumes.

7. The method according to claim 1, further comprising, if the second volumes are virtual volumes which are allocated from a pool volume in units of pages in response to a write request, and if a page has not been allocated for the target volume of the write request:
    running cache control to search cache area for related area of a paired logical volume which is paired with a virtual volume without locking the related area of the paired logical volume as exclusive status.

8. The method according to claim 7, further comprising:
    if data of the related area is stored in a cache area of the paired logical volume, copying the data from the cache area of the paired logical volume to a cache area of the virtual volume;
    if data of the related area is not stored in a cache area of the paired logical volume, copying the data from a disk of the paired logical volume to a cache area of the virtual volume; and
    changing a virtual volume cache area status of the virtual volume to "clean" without a need to unlock the related area of the paired logical volume.

9. The method according to claim 1, further comprising, if the second volumes are virtual volumes which are allocated from a pool volume in units of pages in response to a write request, and if a page has not been allocated for the target volume of the write request:
    allocating a snapshot pool page to a virtual volume page of a virtual volume;
    searching cache area for the related area of a paired logical volume which is paired with a virtual volume;
    checking whether data of the related area is stored in a cache area of the paired logical volume or not, and if yes, copying the data from the cache area of paired logical volume to a cache area of the allocated snapshot pool page, and if no, copying the data from a disk of logical volume area to a cache area of the allocated snapshot pool page; and
    changing the cache status of the copy-on-write snapshot page to "Dirty."

10. The method according to claim 1,
wherein the data stored in the first volume is a Gold Image to be shared by all the host computers;
wherein each host computer is coupled with a corresponding second volume; and
wherein updates to each host computer are stored in the corresponding second volume.

11. A storage system in an information system that includes a plurality of host computers coupled via a network to the storage system, the storage system comprising:
a processor;
a memory;
a storage which has volumes including a first volume and a plurality of second volumes;
a storage controller configured to
store data in the first volume in the storage system;
prohibit write I/O access against the first volume after storing the data in the first volume;
perform subsequent write requests received by the storage system against the second volumes in the storage system after storing the data in the first volume, each write request having a target volume which is one of the second volumes; and
in response to each one write request of the write requests, determine whether the target volume of the one write request is write prohibited or not, and perform the one write request only if the target volume is not write prohibited;
wherein the second volumes are virtual volumes, which are allocated from a pool volume in units of pages in response to a write request; and
wherein the storage controller is configured to write to the pages in the second volumes for performing the subsequent write requests asynchronously.

12. The storage system according to claim 11,
wherein the storage controller is configured to set a flag against a volume, indicating that write access to the volume is prohibited,
wherein determining whether the target volume of the one write request is write prohibited or not includes checking whether the flag is set against the target volume.

13. The storage system according to claim 11, wherein the storage controller is configured to:
receive a read request for one second volume of the plurality of second volumes; and
in response to the read request, provide an image of data obtained from the first volume and data transferred from the one second volume to a host computer.

14. The storage system according to claim 11, wherein the storage controller is configured to:
write data for the subsequent write requests to a cache memory, and
write to the pages from the cache memory before a dirty area of the cache memory reaches a predetermined threshold.

15. The storage system according to claim 11, wherein the subsequent write requests are for snapshot images.

16. The storage system according to claim 11,
wherein the subsequent write requests are sent from the host computers; and
wherein each host computer corresponds to one of the second volumes.

17. A non-transitory computer-readable storage medium storing a plurality of instructions for controlling a data processor to process I/O (input/output) in an information system that includes a plurality of host computers coupled via a network to the storage system, the plurality of instructions comprising:
instructions that cause the data processor to store data in a first volume in the storage system which has volumes including the first volume and a plurality of second volumes;
instructions that cause the data processor to prohibit write I/O access against the first volume after storing the data in the first volume;
instructions that cause the data processor to perform subsequent write requests received by the storage system against the second volumes in the storage system after storing the data in the first volume, each write request having a target volume which is one of the second volumes; and
instructions that cause the data processor to, in response to each one write request of the write requests, determine whether the target volume of the one write request is write prohibited or not, and performing the one write request only if the target volume is not write prohibited;
wherein the second volumes are virtual volumes, which are allocated from a pool volume in units of pages in response to a write request, and
wherein writing to the pages in the second volumes for performing the subsequent write requests are performed asynchronously.

18. The non-transitory computer-readable storage medium according to claim 17, wherein the plurality of instructions further comprise:
instructions that cause the data processor to set a flag against a volume, indicating that write access to the volume is prohibited,
wherein determining whether the target volume of the one write request is write prohibited or not includes checking whether the flag is set against the target volume.

19. The non-transitory computer-readable storage medium according to claim 17, wherein the plurality of instructions further comprise:
instructions that cause the data processor, in response to a read request for one second volume of the plurality of second volumes in the storage system, to provide an image of data obtained from the first volume and data transferred from the one second volume to a host computer.

20. The non-transitory computer-readable storage medium according to claim 17, wherein the plurality of instructions further comprise:
instructions that cause the data processor, if the second volumes are virtual volumes which are allocated from a pool volume in units of pages in response to a write request, and if a page has not been allocated for the target volume of the write request, to run cache control to search cache area for related area of a paired logical volume which is paired with a virtual volume without locking the related area of the paired logical volume as exclusive status.

* * * * *